Aug. 12, 1924.                                                            1,505,026
                    J. H. HOLMGREEN
                        METER BOX
                    Filed Aug. 18, 1922
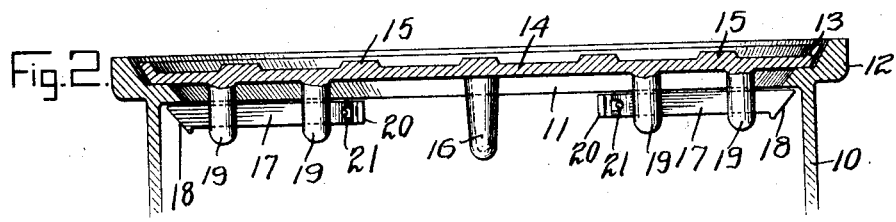
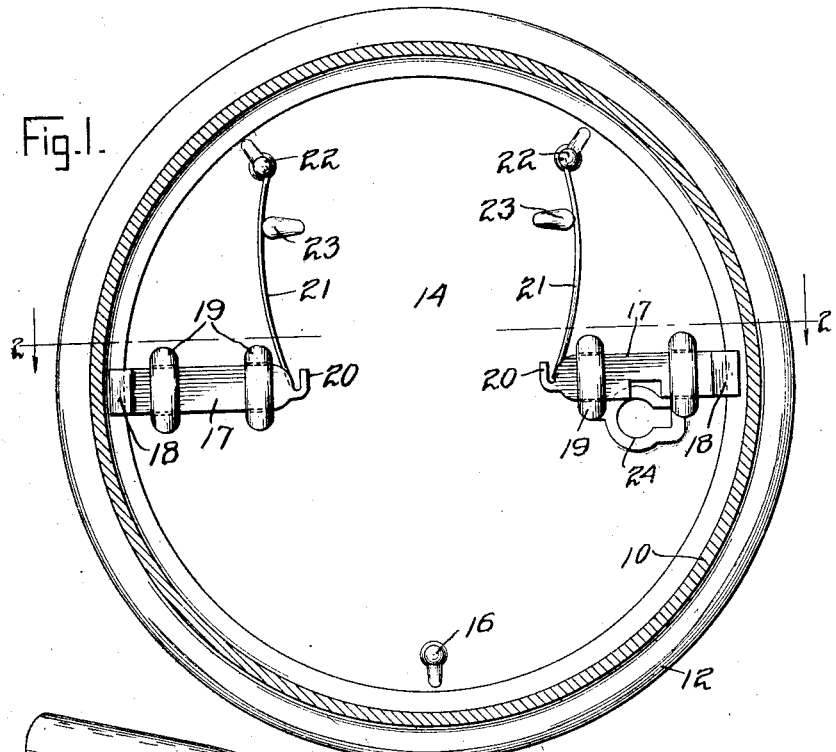
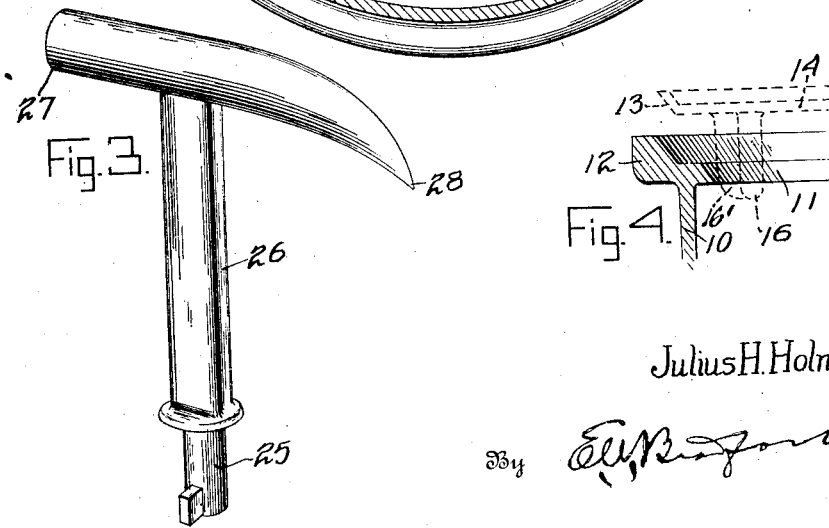
Inventor
Julius H. Holmgreen
By
    Attorney Patented Aug. 12, 1924.

1,505,026

UNITED STATES PATENT OFFICE.

JULIUS H. HOLMGREEN, OF SAN ANTONIO, TEXAS.

METER BOX.

Application filed August 18, 1922. Serial No. 582,773.

*To all whom it may concern:*

Be it known that I, JULIUS H. HOLMGREEN, a citizen of the United States, residing at San Antonio, in the county of Bexar and State of Texas, has invented certain new and useful Improvements in Meter Boxes, of which the following is a specification.

My said invention relates to a meter box and it is an object of the same to provide a meter box with a cover which can be readily and quickly applied thereto.

A further object of the invention is to form the upper end of the meter box in a way to co-act with the cover so as to permit the cover to be applied thereto in any angular position. As is well known, meter readers are commonly rather hasty and careless and where, as is frequently the case, the cover can only be closed in one angular position they are liable to break the lock and leave the cover unlocked since they often merely slam the cover down and leave it so. With my invention, the cover may be turned about its axis to any position and will close on merely being dropped, or if it does not lock may be finally closed and locked by any casual pressure exerted thereon.

A further object of the invention is to provide a novel form of key for use in connection with my improved meter box.

Referring to the drawings, which are made a part hereof and on which similar reference characters indicate similar parts, Figure 1 is a plan of my improved meter box and cover viewed from below, Figure 2 a section on line 2—2 of Figure 1, Figure 3 a perspective of the key, and Figure 4 a section of a portion of the box showing the co-acting relation of the beveled flange and the guide braces of the cover.

In the drawings, reference character 10 indicates the side wall of a meter box of ordinary construction except as herein indicated. At the upper end of the wall is an inwardly extending flange 11 beveled at the inner side. Extending outwardly and upwardly from this flange is a thick upper rim 12 also beveled on the inner side to receive the beveled outer edge 13 of the cover 14. On the upper face of the cover are anti-slip buttons 15. On the under side are two or more guide braces 16 which may be spaced from the bolts now to be described, and which have rounded edges at 16' to co-operate with the beveled edges of rim 12 and flanges 11 in guiding the cover into closed position.

The cover is provided preferably with two locking bolts 17 though the number may be varied if desired. Each of the locking bolts has a beveled end surface at 18 to coact with the surface of the flange 11 in retracting the bolt preliminary to locking the device. A pair of guides 19 is provided for each bolt. At its rear end each bolt has a hook-like projection 20 forming with the body of the bolt a recess to receive one end of a spring 21, which at its other end extends into a recess in a lug 22. One such lug is provided for each spring in addition to those shown at 16 and in addition to their guiding function they act as braces for the cover to prevent accidental displacement. Between the guide brace 22 and the bolt 17 there is located another brace 23 at the opposite side of the spring for holding the spring in place.

In the operation of the device the guide braces 16 co-act with the edge of the flange 11 to guide the cover into position on the top of the box, with the edges 18 on the bolts resting against the beveled edge of the rim. A light additional pressure will now force the bolts back against the tension of their springs whereupon the edges 18 will ride down the correspondingly beveled edge of the flange 11 into their lowest position, after which the bolts will snap outward under the influence of their springs to lock the cover in position.

The cover has a keyhole 24 to receive a key 25 by means of which one bolt 17 may be retracted to unlock the cover. This key is preferably made in one piece with a handle 26 having at the other end a combined hammer and pick formation at 27 and 28 whereby any accumulation of dirt may be scraped away from the outer edge of the cover by the pick or may be broken up by the hammer. The sharp end of the pick may also help to pry up the cover.

It will be obvious to those skilled in the art that many changes may be made in my device without departing from the spirit of the invention, the true scope of which is shown in the appended claims.

Having thus fully described my said invention, what I claim as new and desire to secure by Letters Patent, is:

1. In a meter box, a cover adapted to be moved axially into closing position, bolts carried by said cover, guiding means for said bolts, and spring means operating on each bolt in the rear of said guiding means to retain the cover in position.

2. In a meter box, a cover adapted to be moved axially into closing position, bolts carried by said cover, guiding means for said bolts, spring means operating on each bolt in the rear of said guiding means to retain the cover in position, and means adapted to allow the application of a key to one of the bolts to release the cover.

3. In a meter box, a cover adapted to be moved axially into closing position, guiding lugs for said cover, bolts carried by said cover, guiding means for said bolts, and spring means operating on each bolt in the rear of said guiding means to retain the cover in position, each member of said spring means being attached to one of said guiding lugs.

In witness whereof, I have hereunto set my hand and seal at San Antonio, Texas, this eleventh day of August, A. D. nineteen hundred and twenty-two.

JULIUS H. HOLMGREEN. [L. S.]

Witnesses:
 M. Y. VOIGT,
 ED. W. MATTHIESSEN.